(12) United States Patent
Sun et al.

(10) Patent No.: US 8,474,248 B2
(45) Date of Patent: Jul. 2, 2013

(54) MODEL BASED METHOD FOR SELECTIVE CATALYST REDUCER UREA DOSING STRATEGY

(75) Inventors: Min Sun, Troy, MI (US); Sathish Sankara-Chinttoanony, Westland, MI (US); Bryant Chan Pham, Canton, MI (US); Amr Mohamed Radwan, Canton, MI (US); Zhiping Han, La Salle (CA); Wolfgang Krueger, Farmington, MI (US)

(73) Assignee: Detroit Diesel Corporation, Detroit, MI (US)

( * ) Notice: Subject to any disclaimer, the term of this patent is extended or adjusted under 35 U.S.C. 154(b) by 486 days.

(21) Appl. No.: 12/436,625

(22) Filed: May 6, 2009

(65) Prior Publication Data
US 2010/0281855 A1  Nov. 11, 2010

(51) Int. Cl.
*F01N 3/00* (2006.01)

(52) U.S. Cl.
USPC .................................. 60/295; 60/301; 60/303

(58) Field of Classification Search
USPC ..................... 60/274, 286, 295, 301
See application file for complete search history.

(56) References Cited

U.S. PATENT DOCUMENTS

| | | | |
|---|---|---|---|
| 6,422,219 B1 | 7/2002 | Savonen et al. | |
| 6,625,975 B1 | 9/2003 | Stahl et al. | |
| 6,708,104 B2 | 3/2004 | Avery, Jr. et al. | |
| 6,882,929 B2 | 4/2005 | Liang et al. | |
| 6,928,807 B2 | 8/2005 | Jacob et al. | |
| 7,178,328 B2 | 2/2007 | Solbrig | |
| 2004/0098974 A1* | 5/2004 | Nieuwstadt et al. | 60/286 |
| 2004/0128982 A1* | 7/2004 | Patchett et al. | 60/274 |
| 2005/0262829 A1* | 12/2005 | Itoh et al. | 60/278 |
| 2007/0160508 A1* | 7/2007 | Doumeki et al. | 422/168 |
| 2007/0245714 A1* | 10/2007 | Frazier et al. | 60/276 |
| 2007/0251224 A1 | 11/2007 | Andrews et al. | |
| 2008/0022658 A1 | 1/2008 | Viola et al. | |
| 2008/0022659 A1 | 1/2008 | Viola et al. | |
| 2008/0051976 A1* | 2/2008 | Kimoto et al. | 701/103 |
| 2008/0216463 A1* | 9/2008 | Chaineux et al. | 60/274 |
| 2010/0050614 A1* | 3/2010 | Parmentier et al. | 60/287 |
| 2010/0122524 A1* | 5/2010 | Solbrig | 60/285 |

FOREIGN PATENT DOCUMENTS
WO   WO 2006097268 A1 *  9/2006

* cited by examiner

*Primary Examiner* — Thomas Denion
*Assistant Examiner* — Patrick Maines
(74) *Attorney, Agent, or Firm* — Bill C. Panagos; Linda D. Kennedy; Butzel Long (57) ABSTRACT

A method to control NH3 slippage and $NO_x$ conversion in an electronic controlled internal combustion engine exhaust system equipped with a selective catalyst reducer, a diesel particulate filter, a diesel oxidation catalyst and a urea doser.

8 Claims, 10 Drawing Sheets

MODEL BASED METHOD FOR SELECTIVE CATALYST REDUCER UREA DOSING STRATEGY

TECHNICAL FIELD

Emission control for compression or diesel engines has been a subject of great interest, especially with the advent of new emission control regulations and the need to operate cleaner engines to reduce overall global pollution levels. As a part of this effort, many diesel engine manufacturers have resorted to using exhaust system after treatments that include diesel particulate filers to trap particulate emissions and hydrocarbons, a diesel oxidation catalyst to convert $NO_x$ to $N_2$, (HC to $H_7O$ and $CO_7$) and a selective catalyst reducer with a urea doser to trap $NO_x$ in the SCR until operating conditions of the SCR permit the $NO_x$ to be treated with exposure to ammonia, such as from urea, to change $NO_x$ to $N_2$ gas for emission to the atmosphere.

There is a need for a model based method for developing and implementing a SCR urea dosing strategy.

BACKGROUND

It has become understood that SCR performance will degrade over time, so that as an SCR ages, it is less efficient than it was when installed new in the vehicle exhaust system. In order to maintain required emission standards, it has become necessary to understand the aging process of the SCR and how to adapt the engine operation, particularly the urea dosing to a strategy that takes into account the age of the SCR.

When the SCR is operating at low temperature, ammonia is absorbed by the SCR, whereas at high temperatures, there is an increased ammonia slip past the SCR. At low temperatures, it is desirable to have a very high storage of ammonia in the SCR. At high temperatures, it is desirable to have low ammonia storage in the SCR. It has been determined that an SCR ages as a function of temperature of operation. It has been determined that the storage capacity of the SCR for ammonia degrades with SCR age. As the temperature of the SCR rises to about 500° C. or more, the performance degrades. Understanding the amount of time the SCR operates above a predetermined temperature can be used to map or populate a data table with expected levels of SCR efficiency, so that $NO_x$ and ammonia are not vented to the atmosphere, and so that a warning alert may be made to the vehicle operator once it is determined that the SCR is too old to be effective. Such information may be developed using a map or data points in a table. The map or data points may further be developed according to a one dimension model of the operation of the SCR and a one dimension model inverse logic model for the SCR. There is a need for a method to determine how urea dosing can be adjusted and the engine exhaust gas flow will meet emission standards regardless of the age of the SCR.

SUMMARY

In one embodiment, the present application is directed to a method to control NH3 slippage and $NO_x$ conversion in an electronic controlled internal combustion engine exhaust system equipped with a selective catalyst reducer (SCR) and a urea doser. One method includes determining the SCR operating condition; determining engine out $NO_x$ exhaust flow rate into the SCR; adapting urea dosing conditions to conform to the SCR operating condition; determining ammonia storage, ammonia slip and $NO_x$ conversion in the exhaust gas flow out of the SCR; and recalibrating the SCR operating condition in response to ammonia storage slip and $NO_x$ conversion.

In another embodiment, the method may include determining the SCR operating condition by using temperature of the exhaust and the exhaust flow rate through the SCR to determine SCR age. Generally, the SCR reduced age may be determined by the amount of time the SCR operates above a predetermined temperature. More particularly, the predetermined temperature is in the range of from about 500° C. to about 700° C.

The temperature operation of the SCR may be contained as data points within a map or table of an electronic control module memory, and the SCR condition is predictable by the electronic controller based upon data contained in the map or table.

When the SCR has reached a stable operating condition, urea dosing may be controlled by determining the amount of ammonia storage and slippage in the SCR exhaust gas flow. Generally, the urea dosing may be controlled by an engine control module having memory and urea control strategies resident therein.

When the engine is a compression ignition or diesel engine, adapting urea dosing conditions to current SCR conditions includes considering at least engine air mass flow rate, engine total air flow rate; engine $NO_x$ flow rate; SCR inlet $NO_2$ over $NO_x$ ratio; SCR inlet exhaust pressure; SCR inlet temperature; diesel oxidation temperature; ambient air temperature; diesel particulate filter oxygen flow rate and vehicle speed to develop ammonia rate for urea dosing control.

The ammonia dosing rate of the SCR is controlled by targeting both critical ammonia slip and ammonia storage in the SCR and is targeted to prevent ammonia slip during step acceleration of the vehicle and may vary based on operating conditions. Generally, the engine is operated for a predetermined period of time to determine a stable engine operating condition and ammonia slip. Ammonia storage, ammonia slip, $NO_x$ reduction efficiency may be modeled under one dimension SCR model and desired urea dosing rate with a desired ammonia storage and ammonia slip may be modeled with a one dimension SCR inverse logic model.

DETAILED DESCRIPTION

Figure 1:
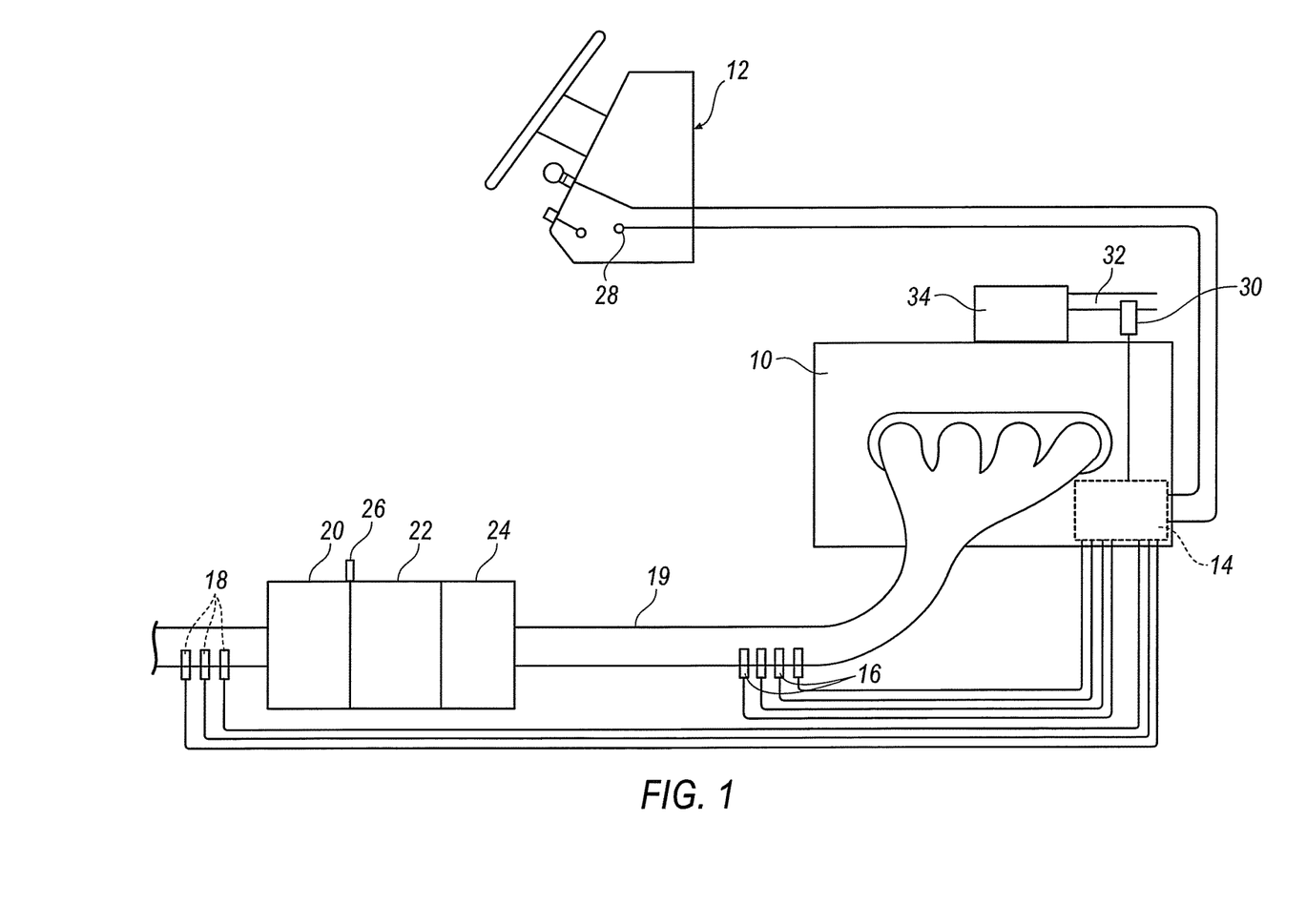
FIG. 1 is a schematic representation of an engine with an exhaust system including a diesel particulate filter (DPF) a selective catalyst reducer (SCR) and a diesel oxidation catalyst (DOC).

Turning now to the drawings wherein like numbers refer to like structures, FIG. 1 schematically illustrates a compression ignition engine 10 for an on-highway vehicle 12. The engine 10 includes an engine control unit 14 that controls operation of the engine 10 and also controls exhaust component urea dosing according to the present invention as described below.

Exhaust manifold sensors 16 and tail pipe sensors 18 provide information to the engine control unit (ECU) 14, that may be comprised of an engine control module and a component control module in communication with each other over an engine common area network (ECAN) that is used to ensure that the component control module and the ECU functions in a coordinated manner to operate the engine and attendant systems. The ECU controls the engine and the exhaust component operation, including urea dosage as will hereinafter be described.

The exhaust manifold sensors 16 may provide information regarding NO$_x$ levels, air/fuel ratios, temperature, and pressure at any of the exhaust system components. More specifically, the exhaust manifold sensors 16 and tail pipe sensors 18 may provide information regarding NO$_R$, and temperature that enable the ECU to detect an impending need for ammonia storage in the SCR or urea dosage. The ECU may also monitor other engine operating parameters to determine the need for urea dosage or ammonia storage. For example, the ECU may contain data tables or maps populated with data. The map or data points may further be developed according to a one dimension model of the operation of the SCR and a one dimension model inverse logic model for the SCR. The ECU, based upon input from sensors at the SCR inlet and SCR outlet uses the tables or maps to determine how urea dosing can be adjusted and the engine exhaust gas flow will meet emission standards regardless of the age of the SCR. The exhaust system is seen with conduit 19 and particulate filter 22, catalyzed soot filter 24, or NO absorber catalyst, such as the SCR 20. Urea doser 26 is in close proximity to the SCR inlet for the administration of urea according to a method of the present disclosure. A warning light 28 may be provided to alert an operator that the SCR is too old to operate efficiently and should be replaced.

Figure 2:
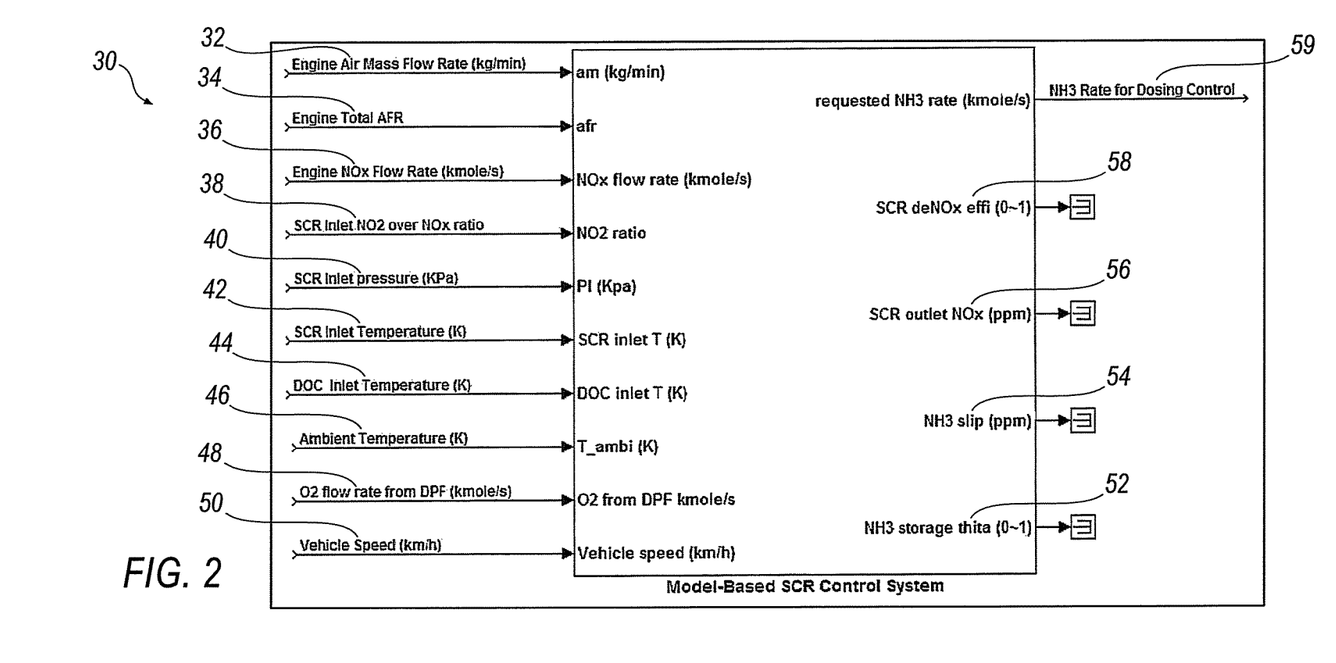
FIG. 2 is a representation of a model based open loop SCR control system I/O.

Turning to FIG. 2, there is illustrated a model based open loop SCR control System I/O 30 according to one embodiment of the present disclosure. Specifically, the model illustrates that engine air mass flow rate 32, engine total air flow rate 34, engine NO flow rate 36, SCR inlet NO$_2$ over NO ratio 38, SCR inlet pressure 40, SCR inlet temperature 42, DOC inlet temperature 44, ambient temperature 46, O$_2$ flow rate from diesel particulate filter (DPF) 48, and vehicle speed 50 are input into the model. The model considers sensor input indicative of ammonia storage of the SCR 52, ammonia slip from the SCR 54, SCR outlet NO 56, SCR deNO$_x$ efficiency 58 and the requested ammonia rate in order to determine and the ammonia rate for dosing and thereby control the urea doser to ensure that the proper amount of urea is used at all stages of the SCR operation as indicated at 59.

Figure 3:
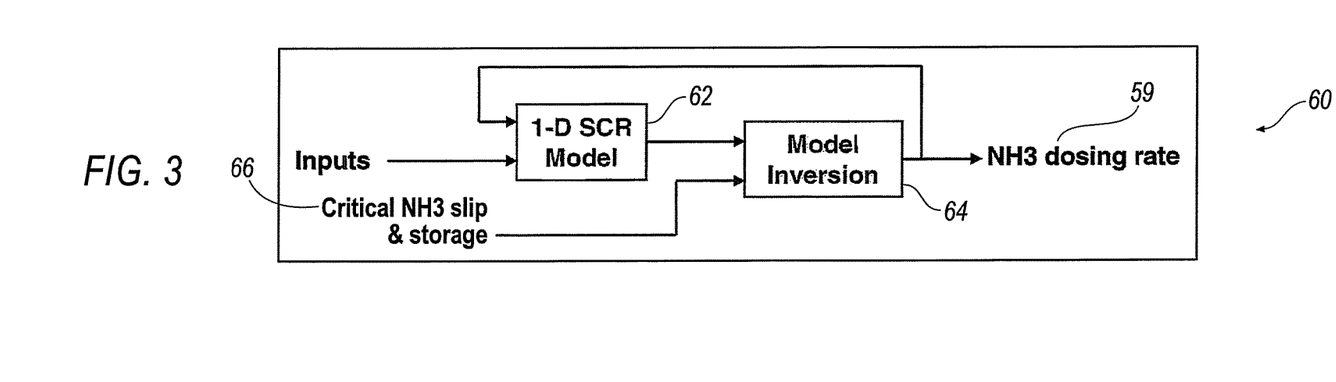
FIG. 3 is a representation of a model showing how ammonia dosing rate is determined.

FIG. 3 is a schematic representation of model 60 showing the inputs as described in relation to FIG. 2 above, and their consideration by a one dimensional model 62 that then inputs its determinations to model inversion 64 which, together with the input regarding critical ammonia storage and slip 66, is considered in the model inversion 64 to determine ammonia dosing rate 59. Note that the ammonia dosing rate is in a feedback loop with the one dimensional SCR model 62 as an input therein. Generally, the urea dosing rate is controlled by targeting the critical ammonia storage and slip in the model schematically presented in FIG. 3.

Specifically, one example to explain the inverse logic of a one dimensional SCR model may be represented by the equation (1)

$$aX^2 + bX + (c - Y) = 0$$

Wherein:
$a = f_a(T, \text{time}_{resi})$
$b = f_b(\theta_{star}, c_{nox})$
$c = f_a(\text{ratio}_{NO2}, C_{O2})$
$\theta_{star} = f_\theta(t, T, \text{time}_{resi}, \text{ratio}_{NO2}, C_{O2}, C_{NOx}, C_{NH3} \cdots)$ One example of the inverse model, as depicted in FIG. 3, may be represented by the equation $$X = \frac{-b \pm \sqrt{b^2 - 4a(c - Y)}}{2a}$$

wherein the variables have the same values as set forth in regard to equation (1) above.

$\theta = 1$ is the ammonia storage capacity of the SCR. If the SCR is fully stored with ammonia, there will be ammonia slippage from the SCR. The higher the ammonia storage levels, the higher the conversion of ammonia and NO$_x$ to N$_2$ will occur, but there will also be higher ammonia slip past the SCR. In operation, based upon engine and SCR conditions, a particular ammonia storage level is targeted so that there can be a higher NO$_x$ conversion rate to N$_2$, thereby reducing ammonia slippage.

FIGS. 4A through 9B are not taken from actual test data, but are merely predictive and provide to illustrate the concept of the instant application.

Figure 4A:
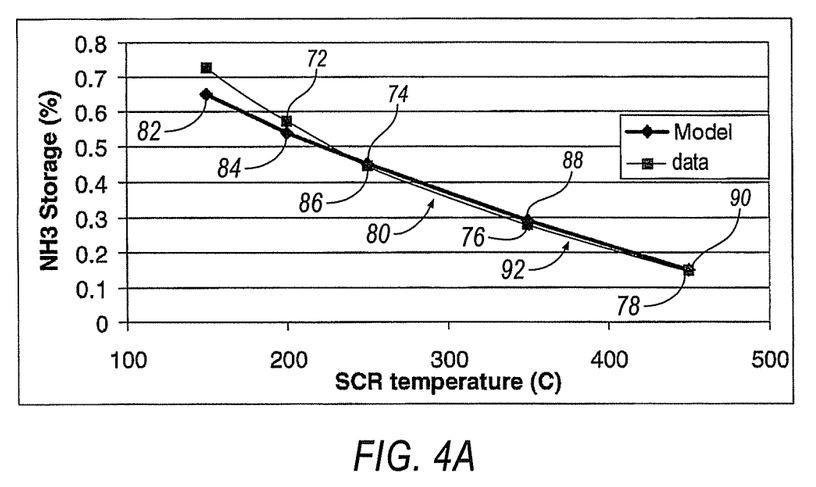
FIG. 4A is a graph showing ammonia storage in the SCR as a function of SCR temperature

FIG. 4A is a graph showing ammonia storage capacity in the SCR as a function of SCR temperature, based upon the model developed according to one embodiment of the present disclosure. Specifically, model data points 70, 72, 24, 76 and 78 form a curve 80, that is almost identical with observed data points 82, 84, 86, 88 and 90 which form an almost identical curve 92 as curve 80. This correlation indicates that the model is a very good predictor of ammonia storage as a function of SCR temperature, and may be relied upon instead of the actual observed data points.

Figure 4B:
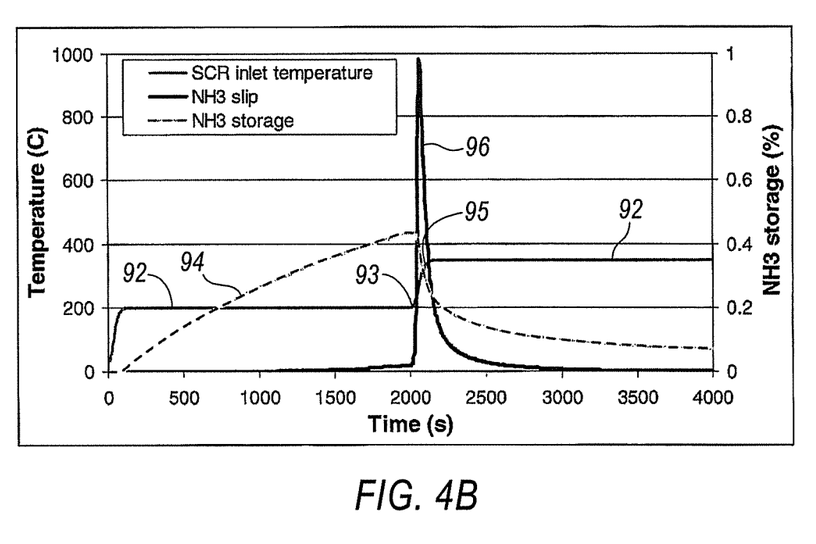
FIG. 4B is a graph showing ammonia storage in the SCR as a function of time and temperature of the SCR.
Figure 5:
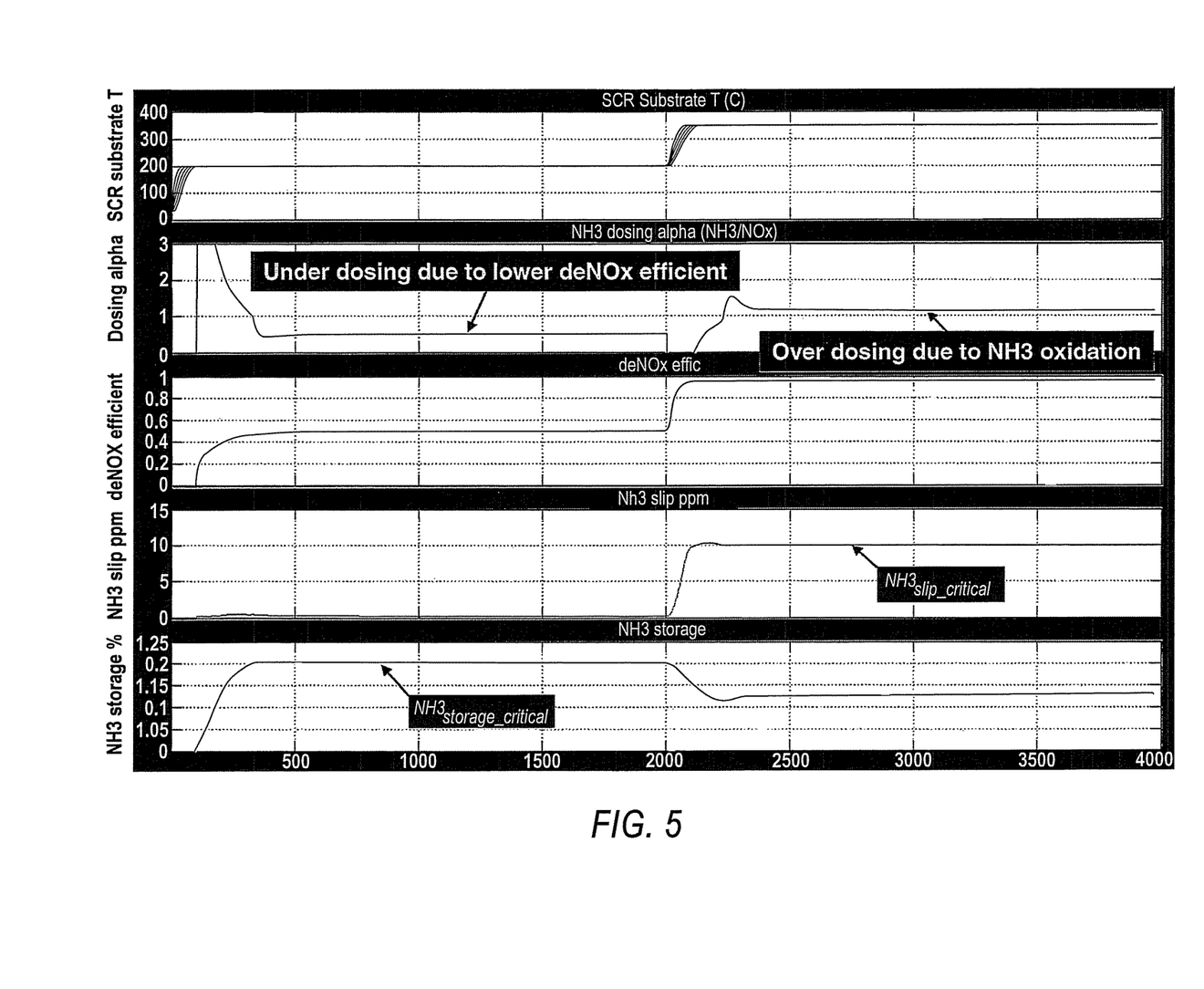
FIG. 5 is a graph demonstrating a model based SCR Control at step acceleration condition.

FIG. 4B is a graph showing ammonia storage level in the SCR as a function of time and temperature of the SCR. It can be seen that as SCR inlet temperature 92 increases to a spike 93 of about 400° C., ammonia storage 94 increases until the SCR inlet temperature reaches about 400° C., at which point 95 ammonia storage decreases, and ammonia slippage increases. Considering the data from the two graphs of FIGS. 4A and 4B, it may be seen that ammonia storage should be limited to prevent ammonia slip past the SCR during step-acceleration operation of the vehicle. The graph shows that the NH$_3$ dosing strategy is best determined by noting when the NH$_3$ slip is equal to NH$_3$ slip critical 93, should be that ammonia slippage should equal ammonia slip critical and the NH$_3$ storage 96 is less than or equal to ammonia storage critical FIG. 5 is a reading of a model based SCR control at step acceleration condition. Basically, the graphs show SCR substrate temperature, dosing alpha, deNO$_x$ efficiency, ammonia slippage past the SCR and ammonia storage percent. It can be seen that under dosing due the lower deNO$_x$ efficiency results in higher ammonia storage critical, whereas overdosing due to ammonia oxidation results in an increase in the ammonia slip critical.

Figure 6:
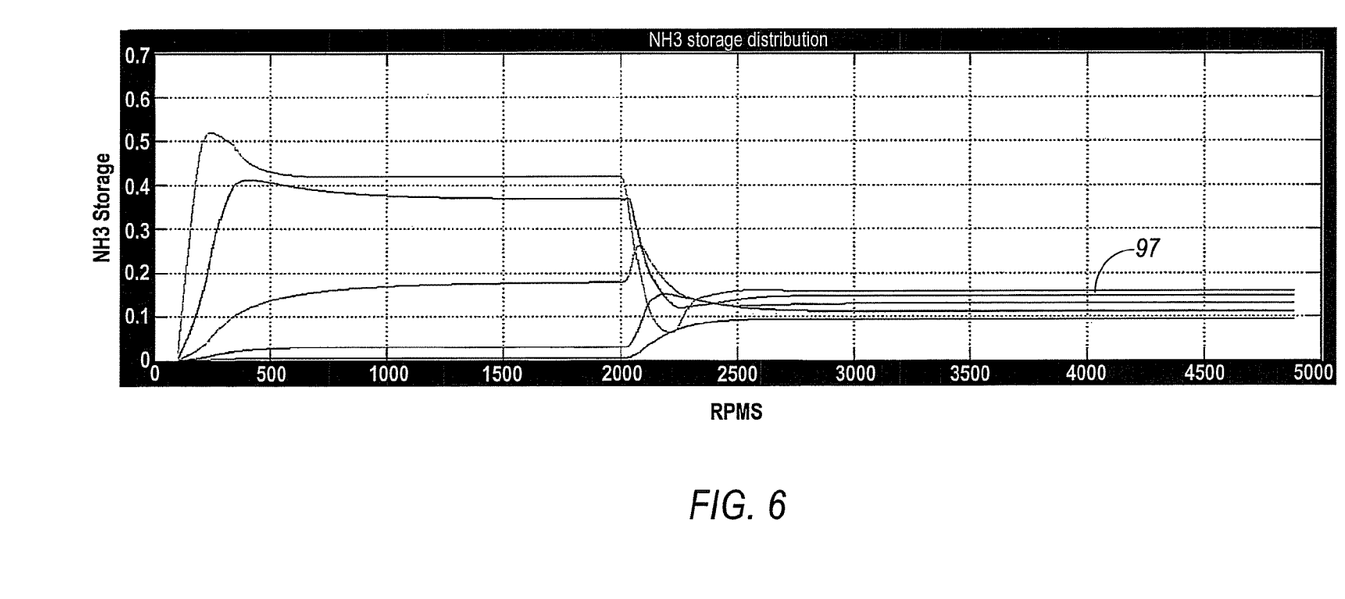
FIG. 6 is graph demonstrating a One Dimension ammonia storage distribution based upon SCR inlet temperature and time.

FIG. 6 is graph demonstrating a One Dimension ammonia storage distribution based upon SCR inlet temperature and time. It can be seen that as the SCR inlet temperature changes from 200 to 350° C., at 2000 RPMS, ammonia storage distribution decreases and assumes an almost steady state as indicated at 97.

Figure 7:
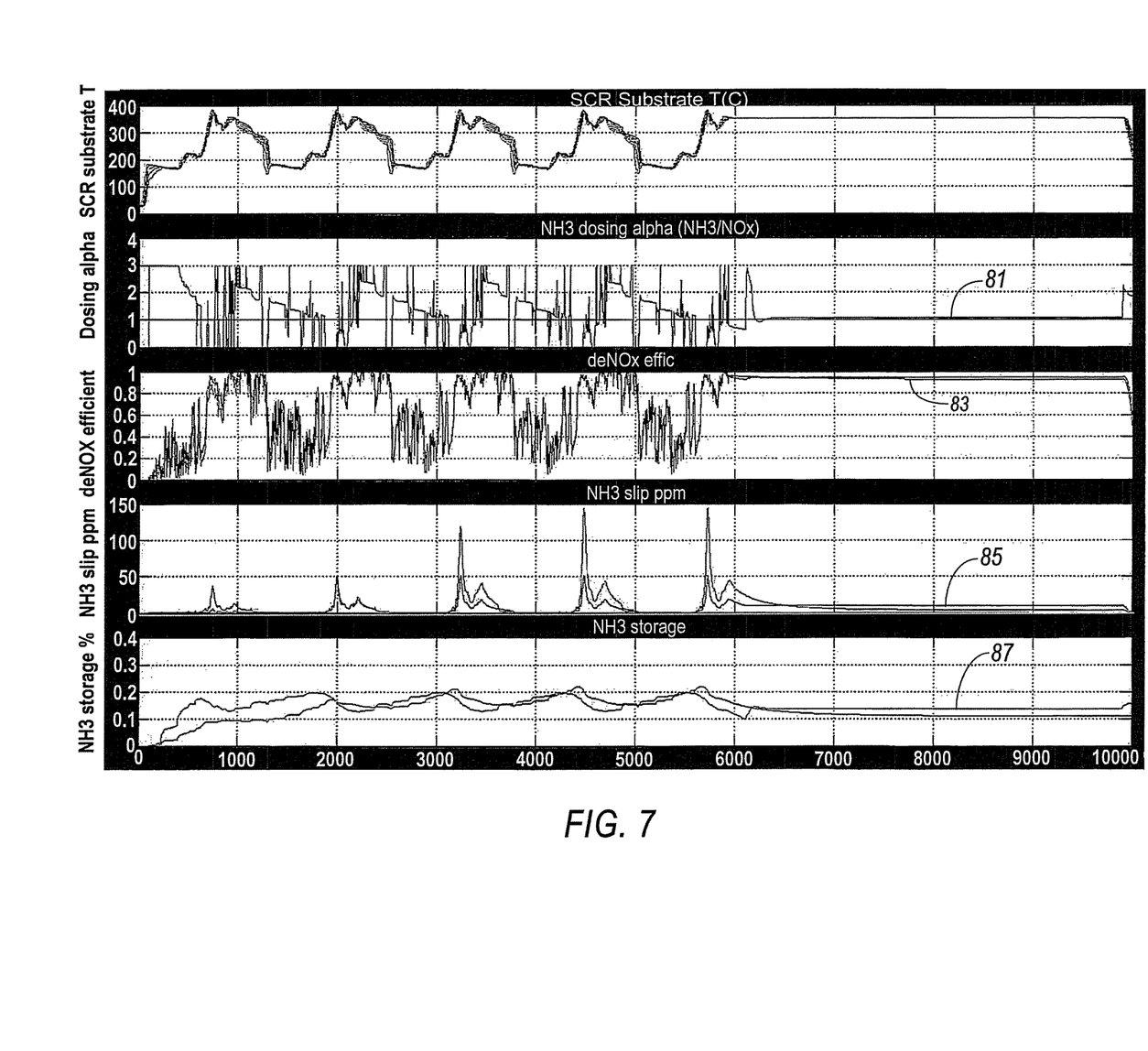
FIG. 7 is a graph showing model based SCR Control at transient and steady state conditions.

FIG. 7 is a graph showing model based SCR Control at transient and steady state conditions. Note that when the SCR substrate reaches a predetermined temperature, in this case of about 350° C., the dosing alpha, deNO$_x$ efficiency ammonia slip and ammonia storage percentage each assumed a steady state, as indicated at 81, 83, 85 and 87 respectively.

Figure 8A:
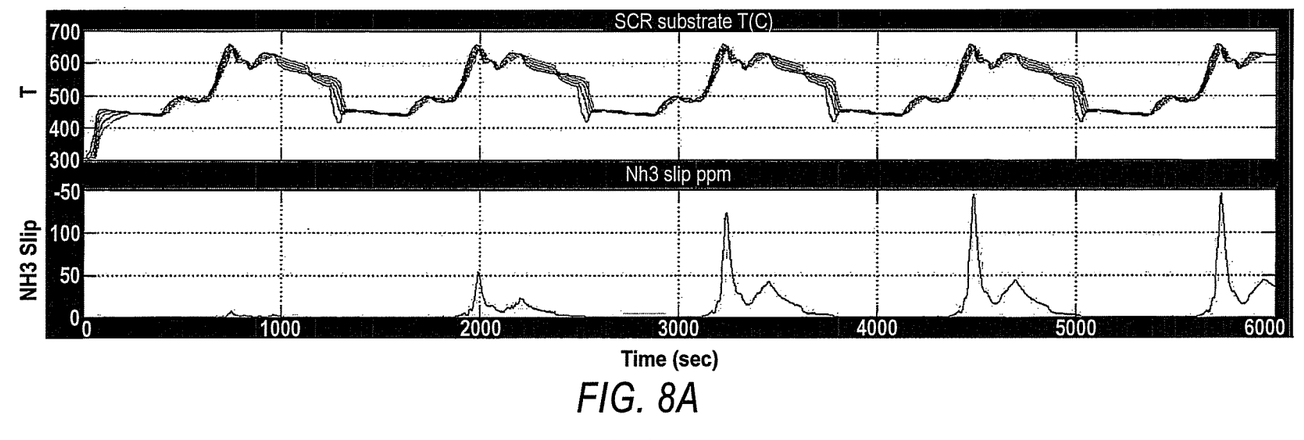
FIGS. 8A and 8B is a graph showing Constant Dosing Alpha Strategy ammonia slip.
Figure 8B:
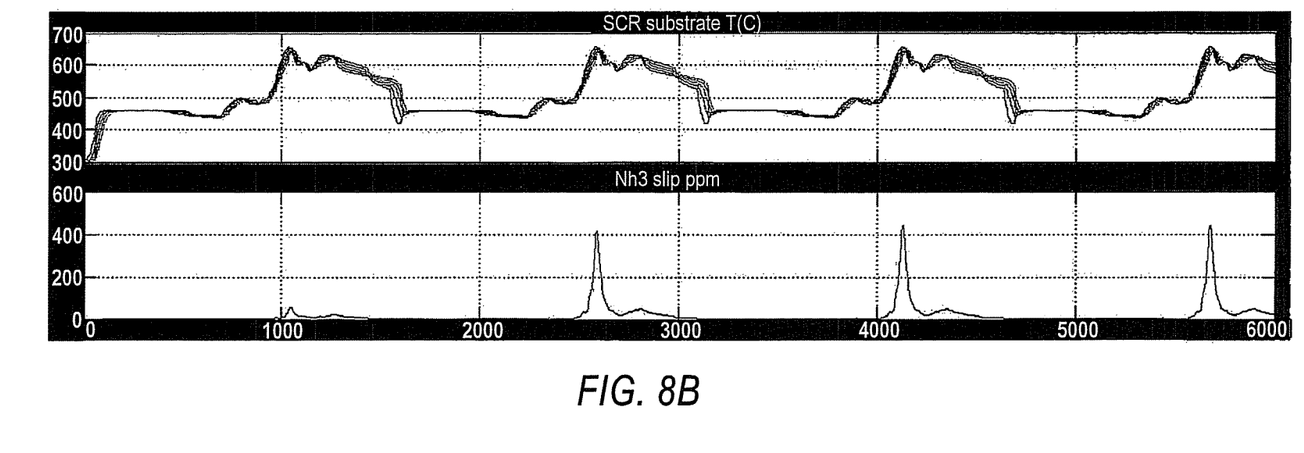

FIGS. 8A and 8B are graphs showing Constant Dosing Alpha Strategy ammonia slip. As seen therein the dosing alpha is equal to 1, and ammonia slip past the SCR depends upon cycles. As is apparent in the graphs, a longer low temperature period permits higher ammonia slip past the SCR. The graph 100 is comprised of two parts. Section 102 is the temperature of the SCR over operating on engine and 104 is the temperature of the SCR in Celsius. Section 106 is NH$_3$ slip as measured in parts per million 108. Time in seconds is shown at 110. As can be seen by reference to graphs 8A & 8B, as CR temperature increases to beyond about 650° C., the NH$_3$ slip, as measured in ppm past the SCR spikes, and then decreases, and then decreases as the SCR temperature decreases due to dosing with fuel. In addition, the longer the period of time the SCR remains at a low temperature, the greater the ammonia slip past the SCR. In addition, ammonia slip past the SCR is independent of engine operation. Rather, it is dependent upon temperature of the SCR.

Figure 8C:
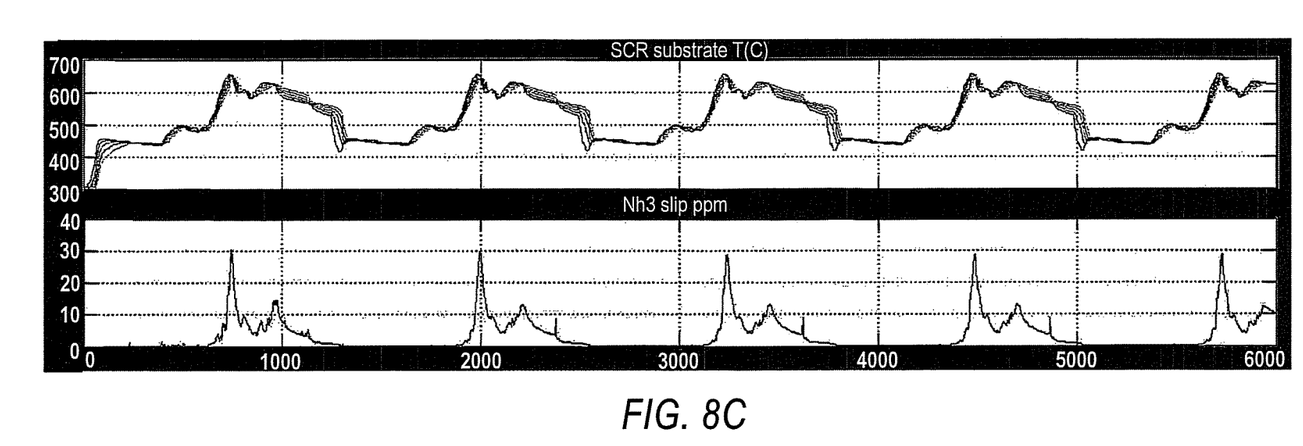
FIGS. 8C and 8D form a graph showing model based dosing strategy ammonia slip according to one embodiment of the present disclosure.
Figure 8D:
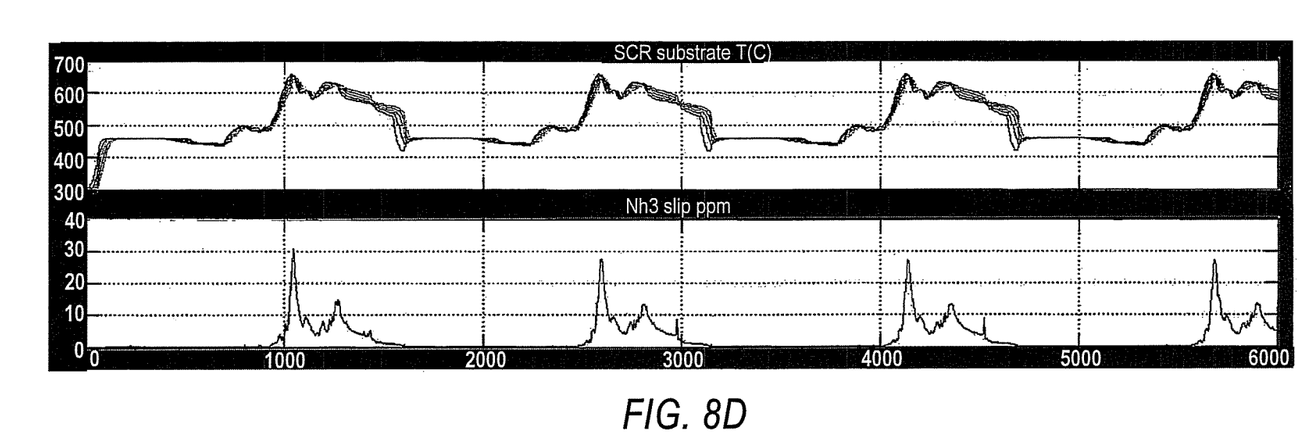

FIGS. 8C and 8D form a graph showing a model based dosing strategy ammonia slip according to one embodiment of the present application. Specifically, the model shows that as SCR temperature passes approximately 650° C., the NH$_3$ slippage spikes, and decreases when the SCR temperature is reduced. Moreover, the model further shows that the NH$_3$ slip is independent of engine cycle time.

Figure 9A:
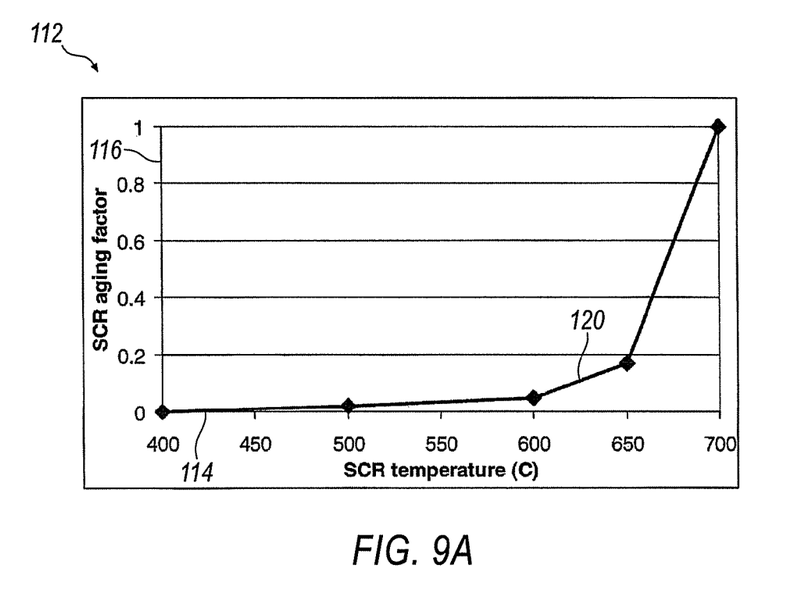
FIG. 9A is a graph showing SCR age as a function of SCR Temperature

FIG. 9A is graph 112 showing a model of SCR aging as a function of SCR Temperature. The X axis 114 is SCR temperature in Celsius, and the Y asix 116 is the SCR aging as a function of SCR temperatures. Basically, the aging of the SCR may be presented by the equation:

$$Age_{SCR} = \Sigma factor_{aging\_equiv} \times t_{step}$$

Using the formula, it is possible to create a SCR aging factor function based on SCR aging test results by assuming aging factor is unit at 700° C., and normalize aging rate at other temperatures to establish a correlation between SCR age and NO$_x$ reduction efficiency.

Figure 9B:
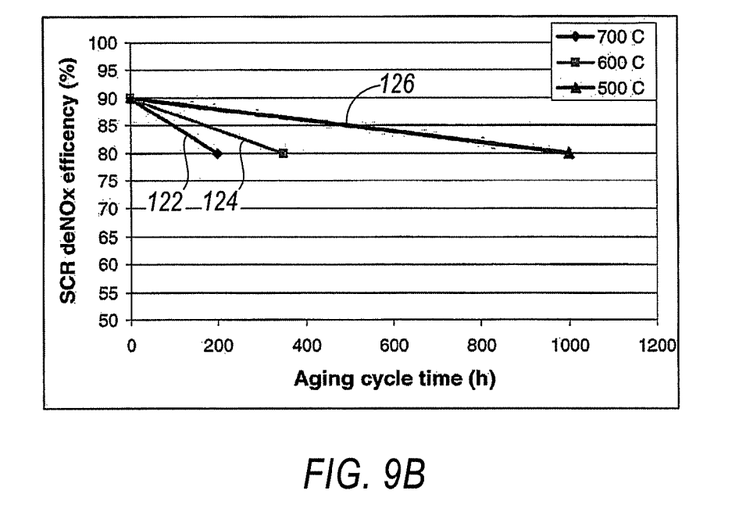
FIG. 9B is a graph showing SCR deNO$_x$ efficiency as a function of SCR aging function time.

FIG. 9B is a graph 118 showing SCR deNO$_x$ efficiency as a function of SCR aging time. To create a SCR aging factor function based on actual SCR test results, it is helpful to assume that the aging factor is a predetermined temperature, in this case, the unit is at about 700° C. The SCR aging rate may be normalized at other temperatures as well. A correlation between the SCR age and the NOX reduction efficiency is established and the plot 120 set forth in FIG. 9A indicates that as SCR Temperature rises, the SCR aging factor rises as well. Similarly, FIG. 9B the plots 122, 124 and 126 indicate that when the SCR is operated at 700° C., 600° C. and 500° C. respectively, the deNO$_x$ efficiency decreases as the SCR aging cycle time advances.

Figure 10:
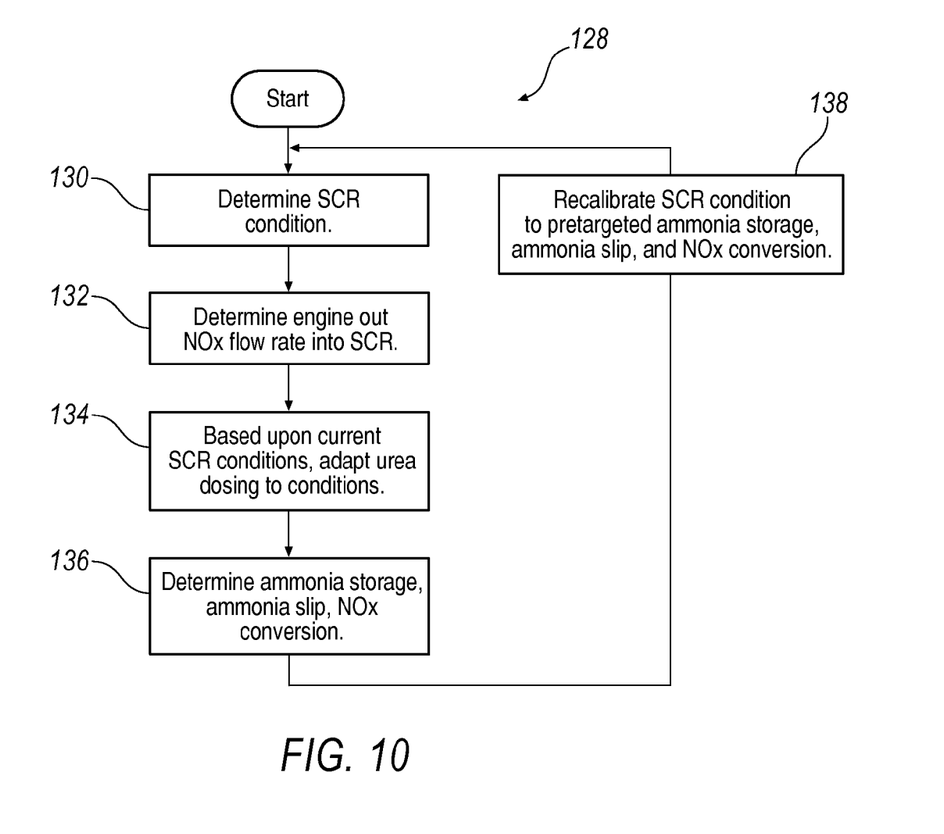
FIG. 10 is a software flow diagram showing one method according to the present disclosure.

FIG. 10 is a software flow diagram showing one method 128 according to the present disclosure. Specifically, step 130 is determining the condition of the SCR. In this regard, temperature and time operated at specific temperature above a predetermined temperature are factors that are considered. Step 132 is determining engine out NO$_x$ flow rate into the SCR. This may be accomplished by sensor input at the SCR inlet. Step 134 is adapting a urea dosing condition to current SCR conditions, according to the model and inverse models as set forth above. Step 136 is determine the ammonia slip, and NO$_x$ conversion at the SCR and step 138 is recalibrate the SCR condition to a pretargeted ammonia storage based upon ammonia slip and NO$_x$ conversion, and the software loops back to step 130.

The words used in the specification are words of description and not words of limitation. Many variations and modifications are possible without departing from the scope and spirit of the invention as set forth in the appended claims.

We claim:

1. A method to control NOx conversion and ammonia slippage-in an electronic controlled internal combustion engine with an electronic control unit (ECU) having maps or data points to control an exhaust system equipped with a selective catalyst reducer (SCR) a diesel particulate filter (DPF), a diesel oxidation catalyst (DOC) and, a urea doser, and sensors to transmit data signals to said ECU indicative of exhaust system operating conditions, comprising:
    determining the SCR operating condition;
    determining engine out NOx exhaust flow rate into the SCR;
    determining NH3 dosing rate by inputting to a one dimensional model engine air mass flow rate, engine total air flow rate (AFR), engine NOx flow rate, SCR inlet NO2/NOx ratio; SCR inlet pressure, SCR inlet temperature, DOC inlet temperature, ambient temperature, oxygen flow rate from said DPF and vehicle speed, to determine NH3 storage of the SCR, ammonia slip from the SCR, SCR outlet NOx, SCR deNOx efficiency and a requested NH3 rate; and providing said determined NH3 storage of the SCR, NH3 slip from the SCR, SCR outlet NOx, SCR deNox efficiency, and the requested NH3 rate to a model inversion together with a critical NH3 slip and storage
    recalibrating the SCR operating condition in response to pre-targeted ammonia storage, ammonia slip, and NOx conversion; and
    injecting urea into the exhaust system.

2. The method of claim 1, wherein said SCR operating condition is determined by using temperature of said exhaust and the exhaust flow rate through the SCR to determine SCR age.

3. The method of claim 2, wherein the SCR reduced age is determined by the amount of time the SCR operates above a predetermined temperature.

4. The method of claim 3, wherein the predetermined temperature is in the range of from 500° C. to 700° C.

5. The method of claim 2, wherein temperature operation of the SCR is contained as data points within a map or table of an electronic control module memory.

6. The method of claim 5, wherein the SCR condition is predictable by the electronic controller based upon data contained in the map or table.

7. The method of claim 1, wherein said urea dosing is controlled by determining the amount of ammonia slippage in the SCR exhaust gas flow.

8. The method of claim 1, wherein the engine is operated for a predetermined period of time to determine a stable engine operating condition and ammonia slip.

* * * * *